United States Patent

[11] 3,599,148

[72] Inventor David M. Stern
Merion Station, Pa.
[21] Appl. No. 818,285
[22] Filed Apr. 22, 1969
[45] Patented Aug. 10, 1971
[73] Assignee Burroughs Corporation
Detroit, Mich.

[54] QUANTIZING CIRCUIT CORRECTION FOR CHARACTER RECOGNITION SYSTEMS
8 Claims, 8 Drawing Figs.

[52] U.S. Cl. .......... 340/146.3 R, 178/69 R
[51] Int. Cl. .......... G06k 9/00
[50] Field of Search .......... 340/146.3; 178/69

[56] References Cited

UNITED STATES PATENTS

| | | | |
|---|---|---|---|
| 3,225,213 | 12/1965 | Hinrichs et al. | 178/69 |
| 3,479,642 | 11/1969 | Bartz | 340/146.3 |
| 3,502,993 | 3/1970 | Schurzinger et al. | 340/146.3 |

*Primary Examiner*—Thomas A. Robinson
*Attorney*—Carl Fissell, Jr.

ABSTRACT: This disclosure relates to a character recognition system having a quantizing circuit which employs a tunnel diode as a discrimination element. This element is adapted to be triggered to produce an output pulse in response to a varying voltage signal generated during the scan of the character. Means are provided to adjust the bias of the discrimination element so that it may have either two stable states or one stable state respectively corresponding to a storage mode and a tracking mode. The condition determining the mode of operation of the discrimination element is the output signal of the quantizing circuit such that, if the circuit has produced an output signal indicating the detection of a portion of a character during the previous clock period, then, the discrimination element will be placed in the tracking mode during the current clock period. If the circuit has produced no output signal during the previous clock period, then, the discrimination element will be placed in the storage mode. Means are provided to vary the threshold level at which the discrimination element is triggered which variation is a function of the previous maximum and minimum input signals received and also to shift that threshold level to detect the incoming signals received during the character scan that rise above a preset minimum value. In this manner, the circuit can self-adjust its threshold level in accordance with the degree of difference in shade between the scanned character and its background, the circuit can produce an output pulse of sufficient width for character recognition even though the portion of the character scanned is a very thin line, and the circuit can respond to the detection of a small gap between two relatively heavy lines in the character being scanned.

INVENTOR.
DAVID M. STERN
BY [signature]
ATTORNEY

INVENTOR.
DAVID M. STERN
BY [signature]
ATTORNEY

INVENTOR.
DAVID M. STERN
BY
ATTORNEY

INVENTOR.
DAVID M. STERN
BY [signature]
ATTORNEY

INVENTOR.
DAVID M. STERN
BY Merwyn L. Young
ATTORNEY

QUANTIZING CIRCUIT CORRECTION FOR CHARACTER RECOGNITION SYSTEMS

BACKGROUND OF THE INVENTION

This invention relates to a character recognition system and more particularly, to a quantizing circuit for such a system, which circuit can self-adjust its threshold level and output pulse width in accordance with the characteristics of the character being scanned.

Early attempts at character recognition were directed toward the recognition of characters having particular styles or fonts, which were of a unique nature and thus readily recognized. Such fonts were so designed that the probability of a particular character being confused with some other character was minimized, as was the possibility of the confusion of the particular font with noise signals that might be generated during the amplification of a detected signal or in the scanning and detection of characters on an uneven background.

More recent prior art has been directed toward the recognition of various characters regardless of their particular form, that is to say, regardless of whether the character was typewritten, lithographed, printed or even hand-written. Such prior art may employ, for example, the implementation of particular decision functions based on a number of different concepts. A particular concept readily adapted to this end is the method of using "neighbor dependence" which method was employed in the Chow Pat., No 3,341,814, that is assigned to the assignee of the present invention. The method disclosed in the Chow patent identifies alpha-numeric characters or other patterns. This method utilizes the conditional probabilities of all input characters or patterns to be read and is based on the statistical history derived from a large number of specimen characters or patterns.

The present invention is adapted to be employed in a system of the type disclosed in the above Chow patent. However, even in a system of that type, the problem of spurious signals being generated and information signals being lost is not long present but is a problem of greater severity than in the font recognition type system. That such a problem is inherent in a general character recognition system is self-evident when it is realized that the system is designed to recognize a particular character having many different forms and thus the probability of recognizing a particular character can be decreased by the existence of areas in the background of the character which are of different shading or are smudged. Or extraneous signals may be generated in the scanning circuitry itself which will reduce the probability of recognizing a given character being scanned.

When the character being scanned is formed of very dark or black lines, on a very white background, the problem of error in character recognition is greatly reduced. However, when the difference in color or shade of gray between the character and the background is a matter of degree, such as when the characters are formed of a dark blue line on a light blue background, the probability of error in character recognition is increased.

Prior art character recognition systems such as disclosed in the above-referred-to Chow patent employ a scanning device such as a cathode-ray tube and an optical system to scan the character under investigation and the reflected light is detected by a photodetector that generates an analog or varying voltage signal which in turn is supplied to a threshold clipping circuit or amplitude quantizer. The pulses which are being analyzed to determine the nature of the character scanned are received from this amplitude quantizer. Once proper quantized pulses have been generated, there is little likelihood of an error being introduced into the system unless there is a circuit malfunction. However, it is in that part of the circuit between the photodetector and the amplitude quantizer in which spurious signals may be generated or where signals may be lost due to variations in the optical signal received from the scanned character due to the problems described above. Such desired signals may represent a thin line in a character or a thin gap between wide lines of a character.

It is therefore an object of the invention to provide an improved character recognition system wherein the probability of error in the character recognition is reduced.

It is another object of the present invention to provide an improved character recognition system wherein the threshold level for selecting one of the signals received from the scanned character can be varied in accordance with the levels of those signals.

Still another object of the present invention is to provide an improved character recognition system wherein the threshold level for discrimination can be varied during the operation of scanning a particular character and also can be varied during each individual scan of that character.

A still further object of the present invention is to provide an improved character recognition system that can recognize characters formed of thin lines or of wide lines with thin gaps between them.

SUMMARY OF THE INVENTION

In a character recognition system of the type employing the present invention, the analog or varying voltage signals generated by the photodetectors are representative of but two types of areas being scanned, namely, the dark area representing a portion of a character and the light area representing a portion of the background. The detection or discrimination device of the system is one which generates a pulse when the area scanned is of the former type and does not generate a pulse when the area being scanned is of the latter type. The discrimination device generates a pulse when the voltage signal generated during the character scan crosses a particular threshold level. The discrimination element and threshold comparator form a quantizing circuit to convert a varying voltage signal into a train of pulses.

Particular situations in which errors in character recognition may occur are where desired information may be lost by the scanning device and include a situation where a line being scanned is relatively thin such that the discrimination device will produce a narrow pulse. Another situation in which error may arise is that in which two wide lines are being scanned which have a narrow separation between them or where the separating area between them is itself relatively dark or gray so that the photodetector generates a relatively small amplitude of signal.

To accomplish the above objects and to overcome the above-described problems, a feature of the present invention resides in a quantizing circuitry or system including means to detect and store representations of the previous maximum signals encountered during the present scan and also means to detect and store the representations of previous minimum signal levels encountered during this can and means to set the threshold level as a function of the respective stored maximum and minimum levels. It is the relation between the threshold level and the incoming analog or varying voltage signal that determines when the discrimination element is to be activated to produce an output pulse during the current clock period. Specific features of the present invention include means to place the discrimination element in a tracking mode during the current clock period should the discrimination element have been activated during the previous clock period and also includes means to momentarily shift the threshold level at which the discrimination element is activated to a lower level to detect any incoming signal rising above a minimum signal level to represent a light gap in a dark pattern under scan.

With the features of the present invention, the threshold voltage level at which a discrimination element generates an output pulse can be varied to be a function of the difference between the various signal amplitudes representing both dark and white area or character and background areas being scanned. Should the differences between these respective signal amplitudes be small or be shifted downwardly relative to the threshold level, the threshold level then will be varied accordingly. Furthermore, should the line being scanned be unduly narrow, nevertheless, the discrimination element will produce an output pulse of a width sufficient for recognition and if a signal representing a white or light gap be detected, the discrimination element will be placed in a storage mode so that such a signal will be reflected in the output signals from the discrimination element.

DESCRIPTION OF THE DRAWINGS

The above and other objects and advantages and features of the present invention will become more readily apparent from a review of the following specification when taken in conjunction with the drawings wherein.

GENERAL DESCRIPTION OF THE QUANTIZING CIRCUIT

Figure 1:
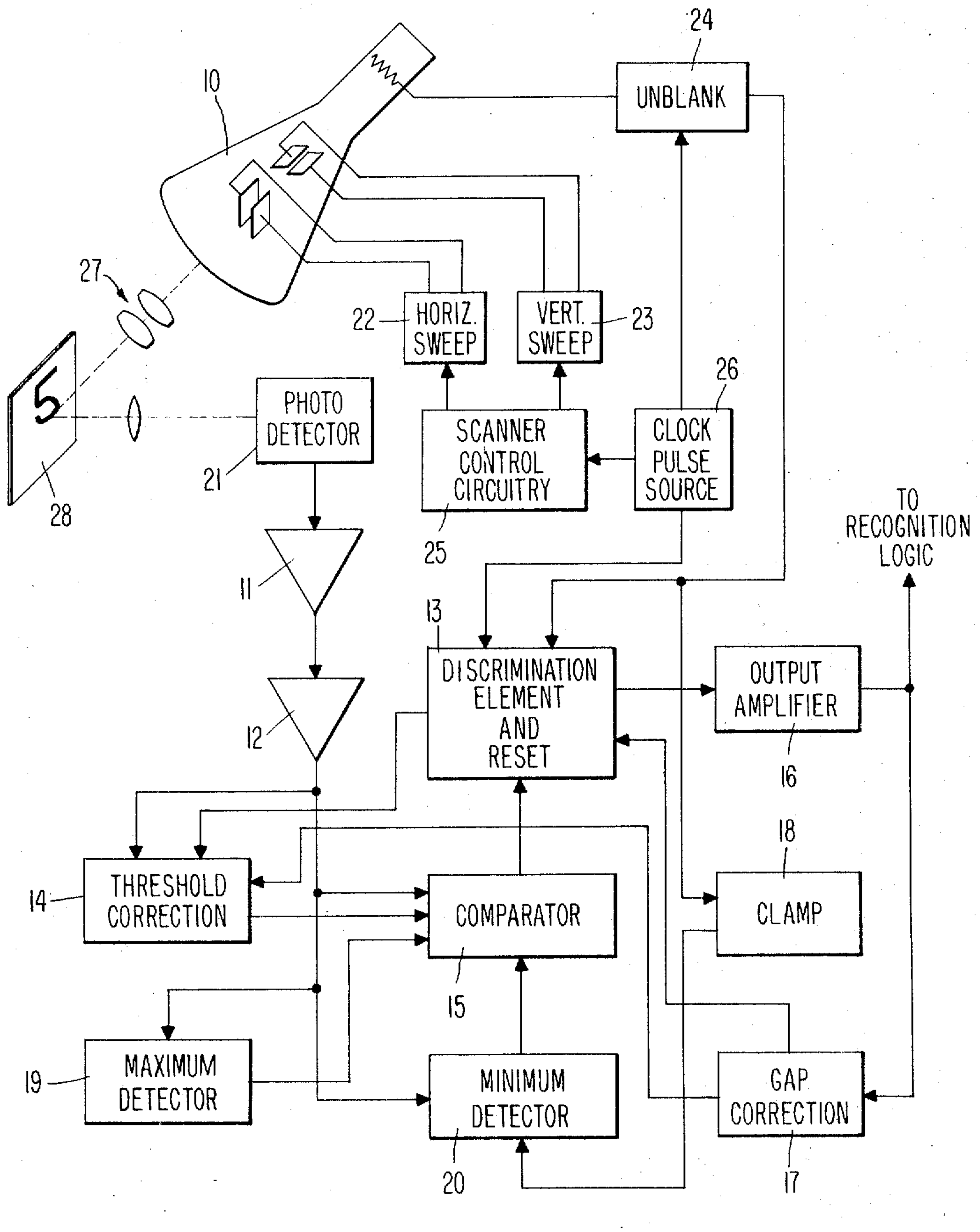
FIG. 1 is a schematic drawing indicating the functional elements of the present invention as employed in a character recognition system.

In FIG. 1, there is shown that portion of the character recognition system whereby a character is scanned, an analog signal representative thereof is generated and then converted to the series of pulses representing the characters scanned. The scanning mechanism per se includes cathode-ray tube 10, the scanning signal from which is focused upon document 28 by suitable lens system 27 and the reflected light from the document is detected by a suitable photodetector 21 which may be a plurality of photomultipliers. The individual scans of the character correspond to the individual vertical sweeps of CRT 10. The signal generated by detector 21 is amplifed by preamplifier 11 and then presented to the contrast stabilizer circuit 12 the output signal from which is then supplied to the quantizing circuitry of the present invention.

The control of the scanning cycle is achieved by scanner control circuitry 25 and clock pulse course 26, the latter of which activates unblank circuit 24. Scanner control circuitry 25 serves to activate horizontal sweep circuit 22 and vertical sweep circuitry 23. It will be appreciated that the entire system illustrated in FIG. 1 is synchronized by clock pulse source 26.

Once the analog signal has been generated and amplified, it is presented simultaneously to threshold correction circuit 14, comparator 15, maximum detector circuit 19 and minimum detector circuit 20. The purpose of maximum detector 19 is to detect and store a representation of the maximum analog signal amplitudes encountered during the recent scans and to supply a signal representing such maximum representation to comparator 15. The purpose of minimum detector 20 is to detect and store a representation of the minimum analog signals encountered during the recent scans and to supply a signal representing this minimum representation to comparator 15. The purpose of comparator 15 is to provide a threshold level signal as a function of the above-referred to maximum and minimum signals and to trigger discrimination element and reset circuitry 13 when the incoming analog signal crosses that threshold level. As indicated in FIG. 1, the pulse generated by discrimination element and reset circuitry 13 is amplified by output amplifier 16 and then supplied to the recognition logic of the character recognition system employed with the present invention.

Gap correction circuitry 17 in FIG. 1 is employed to change the bias of discrimination element of circuit 13 during the current clock cycle if an output pulse has been produced by the output amplifier 16 during the previous clock cycle. This provides the discrimination element with but one stable state and provides a tracking mode. The gap correction function ceases and the discrimination element is placed in storing mode at the next clock pulse provided that output amplifier 16 is not generating an output pulse.

Threshold correction circuitry 14 is adapted to shift the threshold level within a single scan when the incoming analog signal contains a signal of small amplitude in a direction opposite to the maximum black signal, that is to say, opposite to some minimum analog signal. Threshold circuit 14 will be reset by gap correction circuit 17 when the next clock pulse occurs provided that output amplifier 16 is not generating an output pulse.

DESCRIPTION OF RESPECTIVE CIRCUITS

Figure 2:
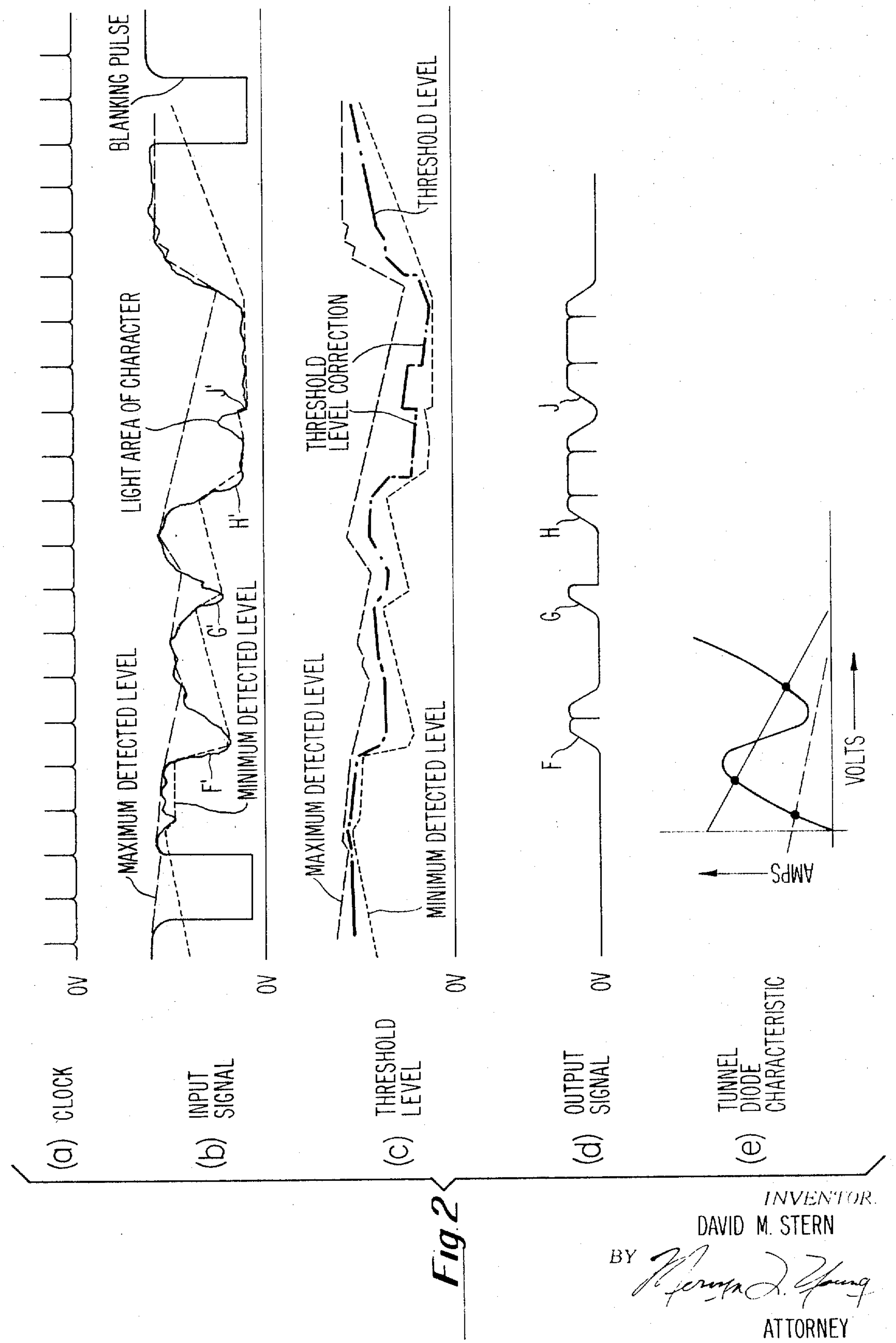
FIGS. 2A, B, C, D and E are waveforms respectively representing the clock period of the present invention, the incoming signals to the quantizing circuit, the varying threshold level of the quantizing circuit, the output signals of the discrimination element of the present invention, and the voltage-current characteristic of the discrimination element.
Figures 3, 4:
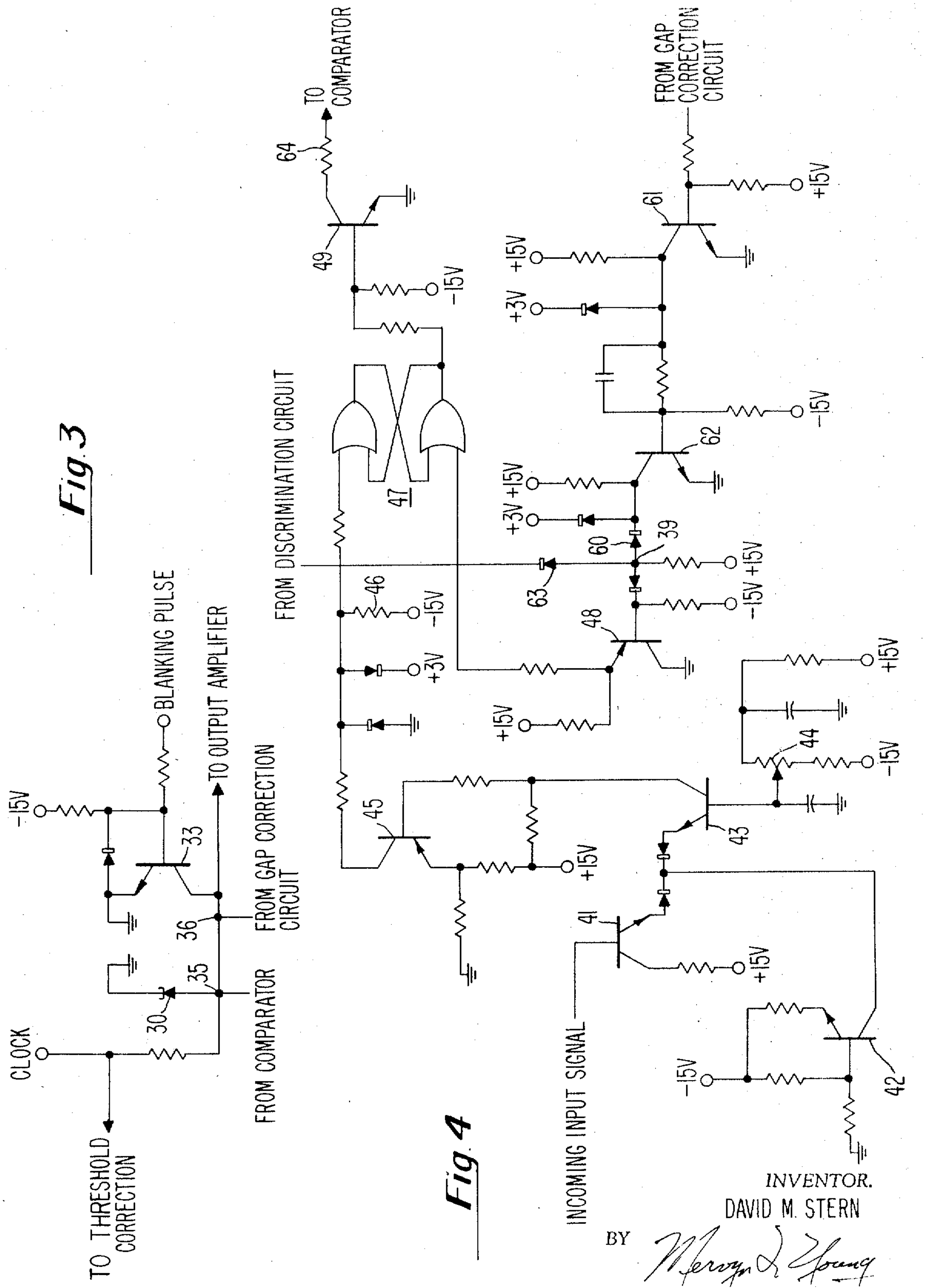
FIG. 3 is a schematic diagram of the discrimination element and reset circuitry of the present invention.
FIG. 4 is a schematic diagram of the threshold correction circuitry of the present invention.

The discrimination element and reset circuitry 13 as illustrated in FIG. 1 will now be described in reference to FIG. 3. Discrimination element 30 is a tunnel diode which is characterized by having a negative resistance portion of the current voltage curve and which may be appropriately biased to have two stable states or just one stable state. A typical curve representative of the tunnel diode operation is shown in FIG. 2E which illustrates how the change of the load line results in the tunnel diode having either one or two stable states. The bistable characteristic allows the discrimination element to be triggered to the second stable state by a voltage pulse and to be reset by a pulse in the opposite polarity. Tunnel diode 30 may be triggered to its second state upon application of pulses received from the comparator at junction 35. NPN transistor 33 is conducting during the blanking period of CRT 10 of FIG. 1 to inhibit the triggering of tunnel diode 30 to produce an output pulse. When operating between two stable states, tunnel diode 30 is in a storing mode which may be inhibited by shunting current away from tunnel diode 30 to gap correction circuit 17 of FIG. 1. This provides tunnel diode 30 with a single stable state and provides a tracking mode. As indicated in FIG. 1, the output of discrimination element and reset circuit 13 is then provided to output amplifier 16.

The signals that trigger tunnel diode 30 to its second or high state are supplied from comparator circuit 15 of FIG. 1 which will now be described in reference to FIG. 5. These signals are generated whenever the incoming analog voltage signal differs from the then current threshold voltage level by an appropriate amount and polarity. To provide this function the incoming analog signal is applied to the base of NPN transistor 51 which with NPN transistor 55 form a differential amplifier. The base of NPN transistor 55 is coupled to the threshold level bridge which will be discussed below. The emitter circuits of both transistors 51 and 55 are completed through NPN transistor 53. Thus, when an incoming analog signal presented to the base of the transistor 51 is less than the signal provided to the base of transistor 55, the emitter signal of transistor 55 causes transistor 51 to cutoff and the current from transistor 53 is shunted through transistor 55. This action causes PNP transistor 54 to provide a positive switching signal to tunnel diode 30. NPN transistor 52 is provided to shunt transistor 51 when the minimum detected signal level is too high indicating no reliable dark area information in the pattern being scanned. This prevents ant output pulse from the quantizing system until the base of transistor 52 is again driven sufficiently negative by conduction through diode network 57 when the minumum detected signal, and thus, the threshold level are of proper valves.

Figure 5:
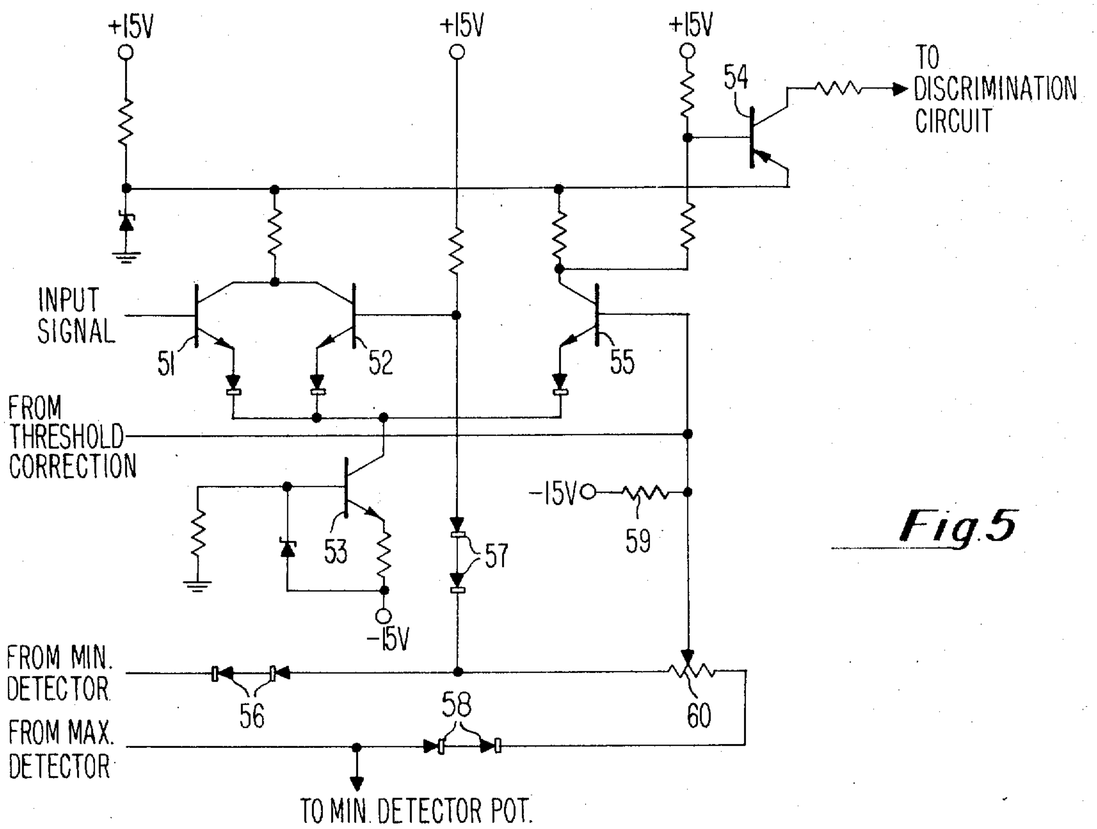
FIG. 5 is a schematic diagram of the comparator circuitry of the present invention.

The threshold level is determined by a potentiometer network as indicated in FIG. 5 which includes diode series 56 and diode series 58. The function of potentiometer 60 is to provide a voltage which is the algebraic sum of the minumum and maximum signals respectively received from minimum detector circuit 20 and maximum detector circuit 19.

Figure 7:
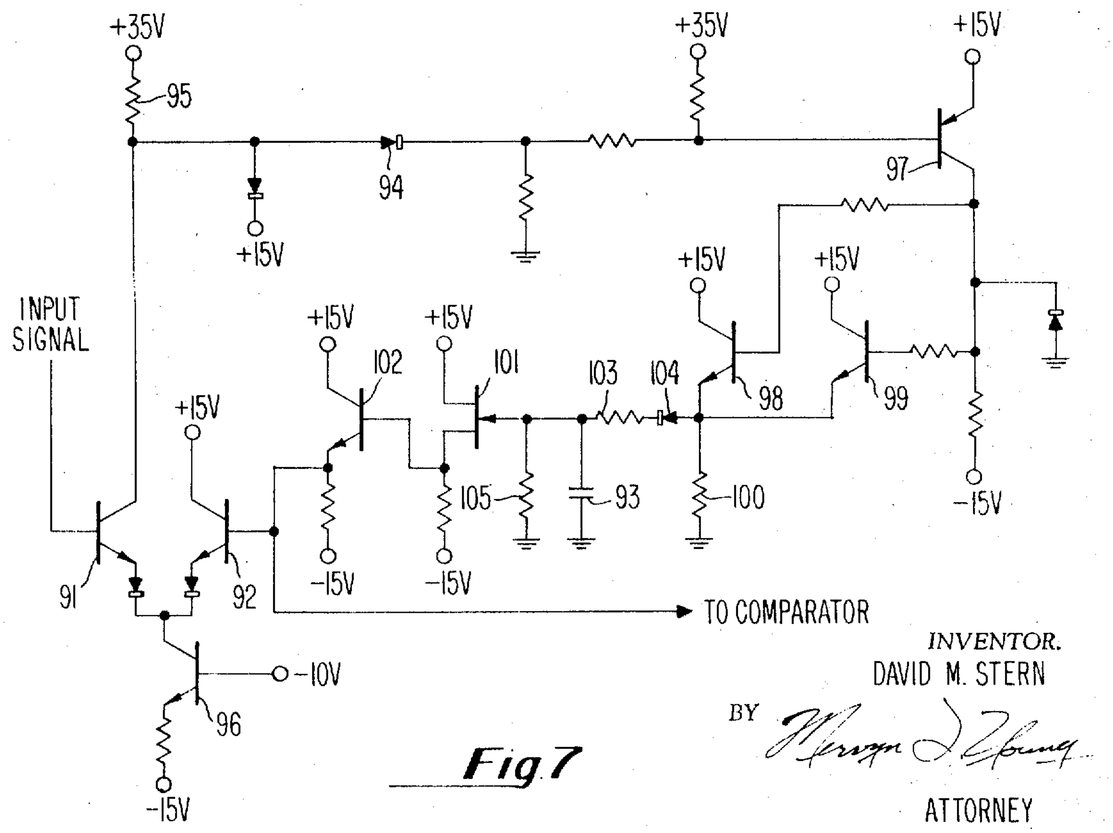
FIG. 7 is a schematic diagram of the maximum detector circuitry of the present invention.

As indicated in FIG. 7, the incoming analog signal is applied to the maximum detector circuit at the base of NPN transistor 91 which with NPN transistor 92 form a differential amplifier. The base of transistor 92 is supplied with a signal representing the previous maximum input signal received during the current scan such that if the current incoming input signal is greater than that previous maximum signal, the collector of transistor 91 will produce an out-going current resulting in a change in voltage drop across resistor 95. The emitter circuits of both transistor 91 and 92 are completed through the current source formed by NPN transistor 96.

The voltage excursion across resistor 95 is transmitted through diode 94 to the base of PNP transistor 97 to supply the switching signals to parallel connected NPN transistors 98 and 99 that in turn charge capacitor 93. It is the charge stored on capacitor 93 which represents the record of the last maximum amplitude of the incoming analog signal encountered during the recent scanning performed by the system. The voltage established across capacitor 93 is transmitted to reference NPN transistor 92 by way of a directly connected series of field effect transistor 101 and NPN transistor 102. The purpose of field effect transistor 101 is to prevent any uncontrolled current leakage that would drain the charge on capacitor 93 and transistor 102 buffers the signal developed by the circuit of transistor 101. The voltage applied to the base of NPN transistor 92 is also the voltage representing the maximum signal encountered by the system during the current scan being performed by the system and it is this voltage which is transmitted to the threshold level bridge of the comparator circuit 15 as has been described above. The circuit of FIG. 7 provides a peak signal detector function which, through the use of binary signal feedback, eliminates the voltage offsets conventionally seen in peak detector circuits.

The rate of rise of the voltage level on capacitor 93 is controlled by the RC time constant of capacitor 93 and resistor 103 and the voltage to which amplifier 97 switches during the charging of capacitor 93. When charging transistors 98 and 99 are turned off, diode 104 becomes reverse biased. Because of the high impedance of diode 104 and FET transistor 101, the discharge of capacitor 93 is primarily controlled by resistor 105.

Figure 8:
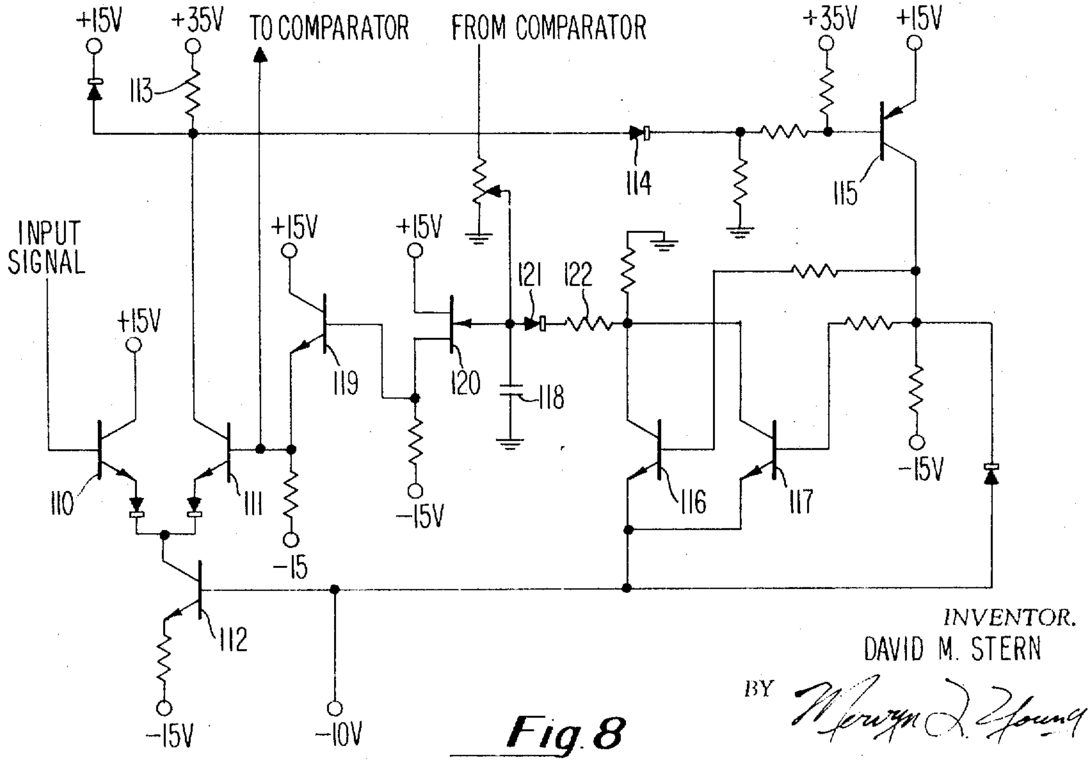
FIG. 8 is a schematic diagram of the minimum detector circuitry of the present invention.

The minimum detection circuit which is shown in FIG. 8 is similar to the maximum detector circuit described above except that its purpose is to detect minimum signals encountered during the recent scans and to this effect the output signal of its comparator indicates that the incoming signal is less positive than the previously stored minimum detected signal. As illustrated in FIG. 8, the incoming analog signal is applied to the base of NPN transistor 110 which with NPN transistor 111 form a differential amplifier. The emitter circuits of both of these transistors are supplied from a constant current source, namely NPN transistor 112. In the case of the maximum detector circuit, the signal taken off the differential amplifier was from the collector of the stage receiving the incoming signal. However, in the case of the minimum detector circuit, the signal is to be inverted and, to this end, the signal ultimately to be stored is taken from the collector of NPN transistor 111 and thus will be an inverted representation of the incoming signal. This current signal will cause a voltage drop across the resistor 113 which voltage drop is transmitted through diode 114 to the base of PNP transistor 115 to regulate the collector current thereof and thus the switching signal applied to the respective bases of parallel connected NPN transistors 116 and 117. These latter two transistors serve to charge capacitor 118. The purpose of capacitor 118 is to maintain a voltage drop thereacross representative of the most minimum amplitude encountered from the incoming analog signal during the recent scans of the system.

Capacitor 118 is initially charged to a positive voltage level near that of the maximum (light area) through potentiometer 123. When the incoming signal contains a negative excursion, capacitor 118 is charged negatively. When the charging operating is interrupted, the high impedance of diode 121 and FET 120 isolates capacitor 118 and its discharge rate is determined by the RC time constant of capacitor 118 and resistor 123. The charging rate is determined by capacitor 118 and resistor 122.

The voltage level established on capacitor 118 is transmitted to the base of NPN transistor 111 of the differential amplifier by way of direct coupled configuration of NPN transistor 119 and field effect transistor 120. As in the case of the maximum detector circuit, field effect transistor 120 of this minimum detector circuit is provided to prevent current leakage and thus the drainage of the charge stored on capacitor 118. The voltage signal as presented to NPN transistor 111 of the differential amplifier is also the minimum voltage signal applied to the threshold level bridge of comparator circuit 15 as was described in relation to FIG. 5.

Figure 6:
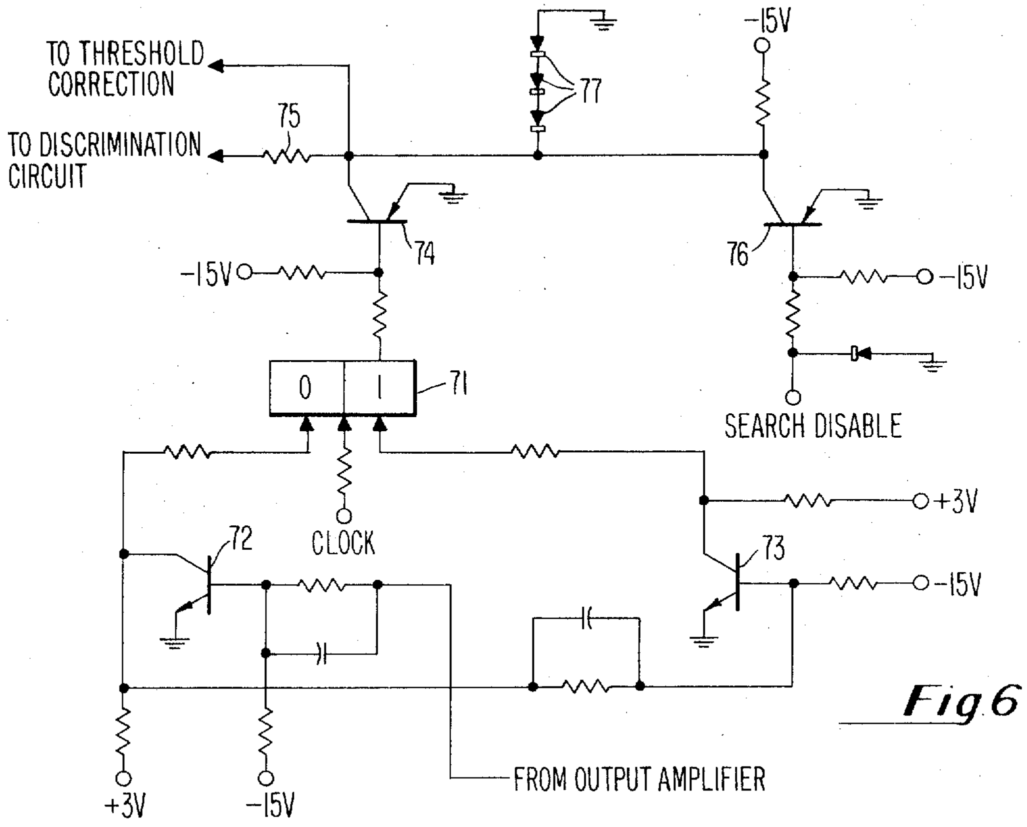
FIG. 6 is a schematic diagram of the gap correction circuitry of the present invention.

Gap correction circuit 17 of FIG. 1 is illustrated in detail in FIG. 6. It will be noted in FIG. 1 that the binary pulse output of output amplifier 16 is supplied to the gap correction circuitry. In FIG. 6, the flip-flop 71 is adapted to reside in either a zero or a one state and will normally reside in the zero state since NPN transistor 72 will not be conducting and thus the voltage at the collector of transistor 72 will reside at approximately 3 volts as indicated in FIG. 6. At this same time, this 3-volt level will be presented to the base of NPN transistor 73 rendering it conductive and thus presenting a 0-volt signal to the one side of flip-flop 71. The flip-flop is switched only at the occurrence of the trailing edge of the clock stroke pulse. When output amplifier 16 of FIG. 1 presents a positive level output pulse representative of the detection of a dark space in the scanned pattern, this signal is transmitted to the gap correction circuitry and to the base of transistor 72 in FIG. 6 to render it conductive, a result of which is that the collector electrode voltage will fall to zero as will the signal presented to the zero side of flip-flop 71. Simultaneously, this zero voltage is presented to the base of transistor 73 rendering it nonconductive and its emitter electrode voltage will rise to approximately 3 volts which signal is presented to the one side of the flip-flop 71. Now when the flip-flop is strobed at the clock time, it will present a positive level output pulse to the base of PNP transistor 74, causing it to become nonconductive and its collector voltage becomes negative to an amount limited by diode string 77. This voltage change is transmitted through resistor 75 to junction 36 of the discrimination element and reset circuitry 13 as illustrated in FIG. 3 and shunts current away from tunnel diode 30 to change its operating conditions and place tunnel diode 30 in a monostable tracking mode. When the output signal of the output amplifier 16 has again fallen to its minimum (light area) state, transistor 72 of FIG. 6 will become nonconductive and the voltage signal presented to the zero side of flip-flop 71 will again be a positive 3 volts and, conversely, the signal provided to the one side of the flip-flop 71 will be 0 volts and transistor 73 will again be conducting. Under this latter condition, tunnel diode 30 is biased back to its bistable condition and a positive pulse representing a dark area but occuring between clock pulses will be stretched to the next clock pulse. When it is desired to inhibit the storage mode of the tunnel diode 30 at times when no relevant information signals are being received, (for example, when the system is in a search mode) an appropriate signal is supplied to the base of PNP transistor 76 thus rendering it conductive and having the same effect as is achieved when transistor 74 is conducting.

Threshold correction circuit 14 of FIG. 1 will now be described with reference to FIG. 4. The function of this circuit is to shift the threshold level in a direction which facilitates detection of a light area signal between excessively high amplitude dark area signals. As shown in FIG. 4, the incoming analog signal is presented to the base of NPN transistor 41 which with NPN transistor 43 forms a differential amplifier comparator circuit. The emitter circuits of both the transistors 41 and 43 are completed through the current source provided by NPN transistor 42. The base of transistor 43 is biased by potentiometer 44 to a level representative of a very high amplitude dark area of the scanned character such that, should the incoming analog signal cross below that minimum level, PNP transistor 45 will be rendered conductive to cause a voltage swing across resistor 46 which positive voltage change serves to set flip-flop 47. A reset signal is periodically presented to flip-flop 47 by PNP transistor 48.

When flip-flop 47 has been set to a state which renders transistor 49 conductive, a signal is provided to comparator circuit 15 of FIG. 1 the consequences of which will now be described in reference to FIG. 5.

As indicated in FIG. 5, the signal received from threshold correction circuitry 14 is applied to the middle of potentiometer 60 which bridges the maximum and minimum detected signal lines. The voltage taken off potentiometer 60 is supplied to the base of transistor 55 to provide the appropriate required threshold level. The threshold correction signal is supplied through resistor 64 of FIG. 4. When transistor 49 of FIG. 4 is rendered conductive, resistor 64 is connected to ground to shift the threshold level toward ground so as to facilitate detection of a small positive-going incoming signal.

Referring again to FIG. 4, the manner in which flip-flop 47 is reset and also inhibited from being changed to zero state will now be described. As indicated, each clock pulse is received at circuit junction 39 by diode 63 which with diode 60 implements a two input AND gate. When both the clock pulse and the signal supplied from the collector of transistor 62 are applied to this gate, emitter follower 48 will generate a positive signal to reset flip-flop 47 and the threshold correction signal to the comparator of FIG. 5 will be removed. The positive signal from transistor 62 will be an inverted representation of flip-flop 71 of the gap correction circuit of FIG. 6. Thus, the clock pulses supplied to diode 63 will act to reset flip-flop 47 when flip-flop 71 is in a zero state, that is, when no positive output pulse is supplied by output amplifier 16 to indicate a detected dark area of the character being scanned.

OPERATION OF THE SYSTEM

The operation of the system and the various waveforms encountered in the system of the present invention will now be described with reference to FIGS. 2A, B, C and D. In FIG. 2, waveform A represents clock cycle which synchronizes the system and serves as a reset pulse. It will be remembered that the respective flip-flops are reset according to conditions existing at a clock time. Waveform B is a representation of the input signal received from stabilizer 12 of FIG. 1 and simultaneously presented to comparator circuit 15, maximum detector circuit 19, minimum detector circuit 20 and threshold correction circuit 14. Also shown in waveform B are the maximum detected level generated by maximum detector circuit 19 and the minimum detected level generated by minimum detector circuit 20. Waveform C also shows the maximum and minimum detected levels as well as the threshold level generated therefrom by the threshold level portion of comparator 15.

It will be remembered that in character scanning, the information being sought is representative of dark lines on a white background and therefore, it is the absence of light being detected by the photodetector rather than the presence of light which represents the information being sought. Thus, waveform B is really an inverse representation of the information being sought by the system. That is to say, that the lesser amplitude signals represent areas of darkness in the character being scanned and it is this information which is to be processed in the character recognition system.

Waveform D represents the positive pulse output signal from output amplifier 16 which pulse signals are then transmitted to the recognition logic of the character recognition system of which the present invention is a part.

The operation of the system can best be described by describing the relation between waveform B (the input signal) and waveform D (the output signal). In waveform D the respective output pulses are designated at F, G, H and J. The corresponding input signals in waveform B which initiated the respective output signals have been provided with the designations F', G', H' and J'. The leading and trailing edges will be determined by the occurrence in time of the input signals except for output signal G. The trailing edges of the output signal G will be related to the clock signal since it is the clock signal that normally resets the tunnel diode discrimination element as has been described above.

When the incoming input signal is of a duration longer than one clock period at F', H' and J', the respective output signals F, H and J will be of a corresponding length. However, when the incoming signal is less than a clock period as shown at G', the corresponding output signal G will be stretched to the end of the clock period. This is accomplished by placing tunnel diode 30 in a bistable or storage mode until detection of an output signal produced during the preceding clock period at which time, tunnel diode 30 is placed in a tracking mode. Thus, the first clock period of each of output pulses F, G, H and J is characteristic of the storage mode and the remaining clock periods of pulses F, H and J are characteristic of the tracking mode.

When the scanning system has detected a small light area in the character being scanned, which area is between two relatively dark heavy lines, such as indicated in waveform B, the threshold level will be shifted downwardly during succeeding clock periods so that the tunnel diode discrimination element can still be triggered to produce an output pulse such as J in waveform D corresponding to signal J' in waveform B. That signal information such as output pulse J' would normally be lost without the present invention will be readily understood from a review of the input signal shape of waveform B. This information is preserved and detected in the present invention because of the gap correction circuitry which serves to condition threshold correction circuit 14 of FIG. 1 to be activated by the next incoming signal representative of a light area to shift the threshold to detect that small signal during a particular clock period, as has been described above. In waveform C, the shift of the threshold level provided by the threshold correction circuitry 14 has been shown.

In addition to the specific functions described, a primary function of the quantizing system of the present invention is to vary the threshold level as a function of the maximum and minimum detection levels encountered during the particular scan of the character. This threshold level is the result of the algebraic summation of the maximum and minimum levels provided by the maximum detector circuit 19 and the minimum detector circuit 20 as illustrated in FIG. 1.

While a particular embodiment of the present invention has been described and illustrated, it will be apparent to those skilled in the art that changes and modifications may be made therein without departing from the spirit and scope of the invention as claimed.

What I claim is:

1. In a pattern recognition system having means to successfully scan portions of a pattern of light and dark areas and generate a varying voltage signal representative of a scanned portion, a pulse quantizing circuit comprising:

threshold means to provide a threshold level signal as a function of the maximum and minimum values of said varying voltage signal which values occurred during either the current scan or a recent scan;

generating means coupled to said threshold means to generate an output pulse when said varying voltage signal crosses said threshold level; and threshold correction means coupled to said threshold means and to said generating means to shift said threshold level signal magnitude toward said varying voltage signal magnitude, when said generating means is generating an output pulse, so as to render said pulse quantizing circuit more responsive to changes in said varying voltage signal when that signal is of a nature to cause the circuit to produce an output pulse.

2. A pulse quantizing circuit according to claim 1 including:

maximum detection means to detect and store a maximum voltage value of said varying voltage signal which value occurred during either the current scan or a recent scan; and minimum detection means to detect and store a minimum voltage value of said varying voltage signal which value occurred during either the current or a recent scan.

3. A pulse quantizing circuit according to claim 1 which circuit is provided with a series of clock pulses and wherein:

said generating means includes a discrimination element adapted to operate in either a tracking mode or a storage mode, said element being adapted to operate in a storage mode when no output pulse was generated at the last clock pulse.

4. A pulse quantizing circuit according to claim 3 wherein:

said threshold correction means is coupled to said descrimination element and adapted to shift said threshold level signal when said descrimination element is adapted to operate in a tracking mode.

5. A pulse quantizing circuit according to claim 3 including:

correction means to maintain said discrimination element in said storage mode until the next occurring clock pulse when said generating means is generating an output pulse.

6. A pulse generating system according to claim 3 wherein:

said discrimination element is a tunnel diode adapted to operate in either a bistable state or a monostable state.

7. In a pattern recognition system having means to successfully scan portions of a pattern of light and dark areas and generate a varying voltage signal representative of a scanned portion, a pulse quantizing circuit comprising:

threshold means to provide a threshold level signal as a function of the maximum and minimum values of said varying voltage signal which values occur during either the current scan or a recent scan;

a source of clock pulses defining equal time intervals:

generating means coupled to said threshold means to generate an output pulse when said varying voltage signal crosses said threshold level; and signal correction means coupled to said generating means to sustain the generation of said output pulse until the next clock pulse even though said varying voltage signal has recrossed said threshold level.

8. A pulse quantizing circuit according to claim 7 wherein:

said signal correction means includes means to inhibit the maintenance of said output pulse generation when an output pulse was being generated at the last preceding clock pulse.